Feb. 3, 1970  R. T. BUTLER  3,493,243
VEHICLE SUSPENSION

Filed Sept. 8, 1967  5 Sheets-Sheet 5

INVENTOR:
RALPH T. BUTLER
BY Paul M. Zenk
ATTORNEY.

3,493,243
VEHICLE SUSPENSION
Ralph T. Butler, 945 E. University Drive,
Springfield, Mo. 65804
Filed Sept. 8, 1967, Ser. No. 666,256
Int. Cl. B60g 5/00, 9/00
U.S. Cl. 280—104.5                                     6 Claims

ABSTRACT OF THE DISCLOSURE

A vehicle suspension for supporting multiple axles upon a vehicle, such as a truck, trailer, or the like. The suspension is constructed in two segments; the first segment being the unsprung section that mounts the axles and sustains almost fully the impact of the road shock developed during vehicle movement, with the second segment comprising the sprung section that connects to the vehicle and is cushioned from the foregoing shock. The unsprung section incorporates support beams that connect through various structures to the axles, and are disposed for controlled movement with respect to the sprung section, thereby governing the transmittal of lateral and longitudinal phase of forces created during vehicle movement. A singular cushioning means is provided intermediate the sprung and unsprung sections to minimize the transferral of the vertical-like component of impact forces.

BACKGROUND OF THE INVENTION

This invention relates in general to vehicle suspensions, and more particularly, pertains to suspensions for a truck, trailer, or the like, that provides for flexibility and facility of use when employed upon any of various sized vehicles, but yet maintains stability when cushioning against the component forces of impact that accompany vehicle movement.

Suspensions have been an essential element in the construction of heavy vehicles, particularly vehicles in the nature of truck-trailer or semitrailers that are constantly being used for hauling loads of any magnitude. Naturally, where the vehicles are employed commercially for transferring goods and merchandise over distances, it becomes a requisite that a high degree of care be exercised so as to prevent the slightest damage to said cargo. Heretofore, vehicle suspensions have mainly been designed and constructed as metallic springs that have a certain degree of inherent resiliency so as to cushion against the shock of vehicle impact constantly arising during operation of the vehicle. Suspensions constructed in this manner have been adequate for alleviating the vertical-like components of these impact forces, and thereby prevent the development and occurrence of heavy damage to any cargo being conveyed. But, suspensions of this type are generally unable to buffer the minor stresses and forces that arise laterally or longitudinally of the vehicle body. As a result, the impact of these forces are yet transferred almost fully to the load carrying compartment of the vehicle, oftentimes causing damage therein. Additionally, vehicle suspensions constructed of the spring design cannot be conveniently regulated, either mechanically or automatically, to adjust to the load being supported. Such suspensions have a built-in unvarying resiliency and resistivity in response to the forces exerted upon them, with their efficiency to buffer the shock of these forces normally decreasing as the load applied upon them is increased.

The more customary vehicle suspensions have been constructed utilizing the principle of preventing the transmission of shock from the vehicle axles to the vehicle body by the use of air springs. As thus far manufactured, such suspensions include a plurality of packages of pressurized air that are positioned at specific points intermediate the axle suspensions and the vehicle frame to which they connect. These air spring suspensions enhance the dampening of vehicle shock, and prevent its transfer to the vehicle. Certain deficiencies, though, are present in the use of this type of suspension. Since a plurality of these air springs or packages are utilized in the aforesaid type suspension, it frequently occurs that one or more of them may be easily punctured, ruptured, or even hold compressed air at a pressure differing from the remaining packages. As a result, the support of the vehicle load becomes rather unequalled, and causes the vehicle body to become unaligned upon its axles. When such occurs, the load carried in the vehicle is subject to shift, either violently as when the vehicle is subjected to any impact of sufficient magnitude, or gradually by means of the vibrations imparted to the vehicle during its constant movement over the roadway. This shifting of the cargo, unless it is secured tightly in situ, can cause its damage. Another problem of the present air suspensions is that they are designed to only cushion the vehicle body from the near vertical components of any forces or impact, and due consideration has not been given to the other components of the road impact that may eventually be just as damaging to the cargo. For example, frequently an individual wheel of a tandem of axles may encounter an obstacle, such as a rock or hole in the roadway, which causes this particular wheel and axle to be separately forced out of alignment with the remaining axles. The forces accompanying such an impact are not only directed vertically, but are also exerted in various lateral directions. Where the air suspensions heretofore constructed effectively resist against the interference of shock associated with the aforesaid vertical forces, such suspensions impart little or no resistance to the remaining component of forces.

Another problem frequently associated with air suspensions in their inability to obviate the sway of the vehicle body especially while encountering a curved roadway during high speed travel. The damage that can be caused to contained cargo as a result of the vehicle body being inclined or unaligned has been heretofore discussed.

It is the principal object of this invention to provide a vehicle suspension that effectively prevents the transmittal from the vehicle axles to its body and frame of any component of the forces of impact that are frequently encountered during movement of the vehicle.

It is another object of this invention to provide a vehicle suspension which may be easily manually adjusted to provide effective cushioning for any type of load that may be conveyed in the vehicle body.

It is a further object of this invention to provide a vehicle suspension which substantially maintains the vehicle body in constant level alignment regardless of how imbalanced a cargo may be loaded upon the vehicle.

It is an additional object of this invention to provide for a reduction in axle roll and furnish a more balanced braking action of a heavy vehicle by the combined use of a singled air cushioning means in conjunction with a support means that allows for uniform distribution of the braking forces throughout the entire suspension, insuring that each wheel of the vehicle effectively and proportionately aids in reducing the speed and stopping the vehicle.

It is still another object of this invention to provide a vehicle suspension that effectively reduces the inordinate centrifugal sway concomitant with the movement of the vehicle around a curved roadway.

It is yet another object of this invention to provide a vehicle suspension incorporating support means that advantageously maintains constant axle center distance and alignment during operation of the vehicle.

It is still a further object of this invention to provide a vehicle suspension incorporating a singular air cushioning means that may be facilely adjusted for regulation of the amount and pressure of the air contained therein.

Other objects will become apparent to those skilled in the art in the light of the following description and accompanying drawings.

SUMMARY OF THE INVENTION

This invention provides an improvement upon existing vehicle suspensions of the type that are constructed as an independent unit, and which may be mounted to the substructure of various vehicles, such as the common tractor-trailer used for hauling heavy capacity loads. The invention contemplates the problems present in existing vehicle suspensions, and attempts to rectify the same and perfect this alternative which renders the subject suspension more efficient when used in conjunction with the aforesaid type vehicles.

Ordinarily a heavy load transfer vehicle utilizes a plurality of tandem axle units that mount to the rearward portion of its trailer. These series of axles are connected a fixed distance from the underside of said trailer or vehicle body by means of a suspension, and the composite unit of suspension and axles is normally constructed in separate segments generally designated the sprung and unsprung sections of the suspension. As a point of information, the unsprung section is usually that part of the suspension which includes the vehicle wheels and axles and is directly exposed to and designed to absorb the road shock normally arising during vehicle movement. It is desired that the absorption of the shock by this unsprung section prevents the transmission of any impact forces into the sprung section of the suspension mainly comprising a connecting framework, which mounts directly to the underside of the trailer body or frame.

To improve upon the foregoing, this invention incorporates a pair of support means including a pair of equalizing arms that secure proximately to each end of the vehicle axles by means of axle seats. Each equalizing arm rotatably connects near its center to a trunnion, giving it a slight degree of rotation for providing some axle play to ease the impact of road travel. Each equalizing arm is integral from axle to axle, and although it may rotate or pivot a few degrees with the shift of any axle, it maintains a constant distance between axle centers. Such is desirable and an advantage especially in the belt driven vehicles. A pair of torque rods connect to the axle seats and the end of each equalizing arm, and are most effective for preventing distortion of the equalizing arm such as when the vehicle encounters rough pavement, and also acts to prevent what is called vehicle hopping due to axle roll initiated by a rapid application of the brakes of the vehicle while traveling at substantial velocity. Suspensions heretofore that employed torque arms for the purpose of alleviating the malfunctions just described usually connected one end of said arms to the axle in the unsprung section of the vehicle, and attached the other ends of the arms to the vehicle framework. It is obvious that under such an arrangement certain aspects of the road impact and shock would be transmitted to the vehicle, bypassing the suspension. The foregoing arrangement of this invention not only prevents this problem, but is effective in partially cushioning against the longitudinal and the somewhat lateral components of forces caused during normal vehicle movement.

Connecting integrally with the trunnion are a pair of support beams, with each beam pivotally mounting at its forward end to the substructure or framework of the vehicle body, while its opposite end is disposed for limited movement under the regulation and control of the same vehicle framework. Hence, any slight vertical or near vertical component of forces transmitted to the trunnion will be partially absorbed by the slight pivotal play allowed by this method of interconnection of the support beams to the framework. Further mounted to the trunnion intermediate and contiguous to the adjacent support beams are a pair of structural members which expand upwardly to form surface areas disposed above the trunnion, with said areas being arranged approximately parallel to and a fixed distance from the framework. Disposed tightly in this spacing is a cushioning means, such as a bellows or the like, which effectively springs the load and absorbs a substantial portion of the vertical or near vertical impact forces, thereby preventing their transmission from the unsprung to the sprung section of the suspension and vehicle. This interaction of the various equalizing arms, support beams, and structural members provides that amount of rotatable, pivotal, and vertical shifting movements necessary for effective absorption of substantially most components of any shock created during movement of the vehicle upon a roadway or the like.

The use of a singular cushioning means or bellows in the suspension is especially useful from the viewpoint of control. A readily exposed air valve connecting with the bellows provides for the insertion or release of air into or from said bellows, thereby providing a rapid means for a regulation of its internal pressure, and allowing for the convenient adjustment of the suspension to that pressure setting determined as most effective for sustaining the load upon the vehicle damage free, while preventing any transmission of road shock to the same. For example, it has been found that a lower air pressure contained in a bellows is more effective in cushioning the vehicle body from shock than a bellows made rigid due to excessive air pressure. By use of a singular cushioning means in the suspension, the operator may quickly manipulate the air valve immediately after the vehicle is loaded, and reduce the pressure contained in said means to that amount necessary to properly sustain and insulate from shock the particular load packed upon said vehicle. This ease of regulation is quite an advantage to tractor-trailer operations, since these vehicles nowadays may be only slightly loaded or loaded to capacity with cargo that may be of any weight.

In addition, the use of a single cushioning means, or air bellows, minimizes one problem that frequently occurs in present day air springs that include a plurality of elastic air packages, and that is, the latter form of suspension experiences frequent rupture of its air springs since unequal forces are continuously exerted upon different parts of the suspension, requiring that a single small air spring support the full brunt of the impact. But, where a singular bellows is employed having a total surface area and volume of air that extends almost totally across the underside of a vehicle body, the likelihood of fracture is greatly diminished. It is also much easier to regulate the air pressure in a singular cushioning means than in a suspension employing a plurality of such means.

The vehicle suspension of this invention is unique in employing in combination a singular cushioning means and the structural support means. Whereas, the cushioning means effectively buffers the vehicle load, springing and insulating it against the impact forces, the support means is useful in effecting an equalization of the load.

DESCRIPTION OF THE PREFERRED EMBODIMENT

Figure 1:
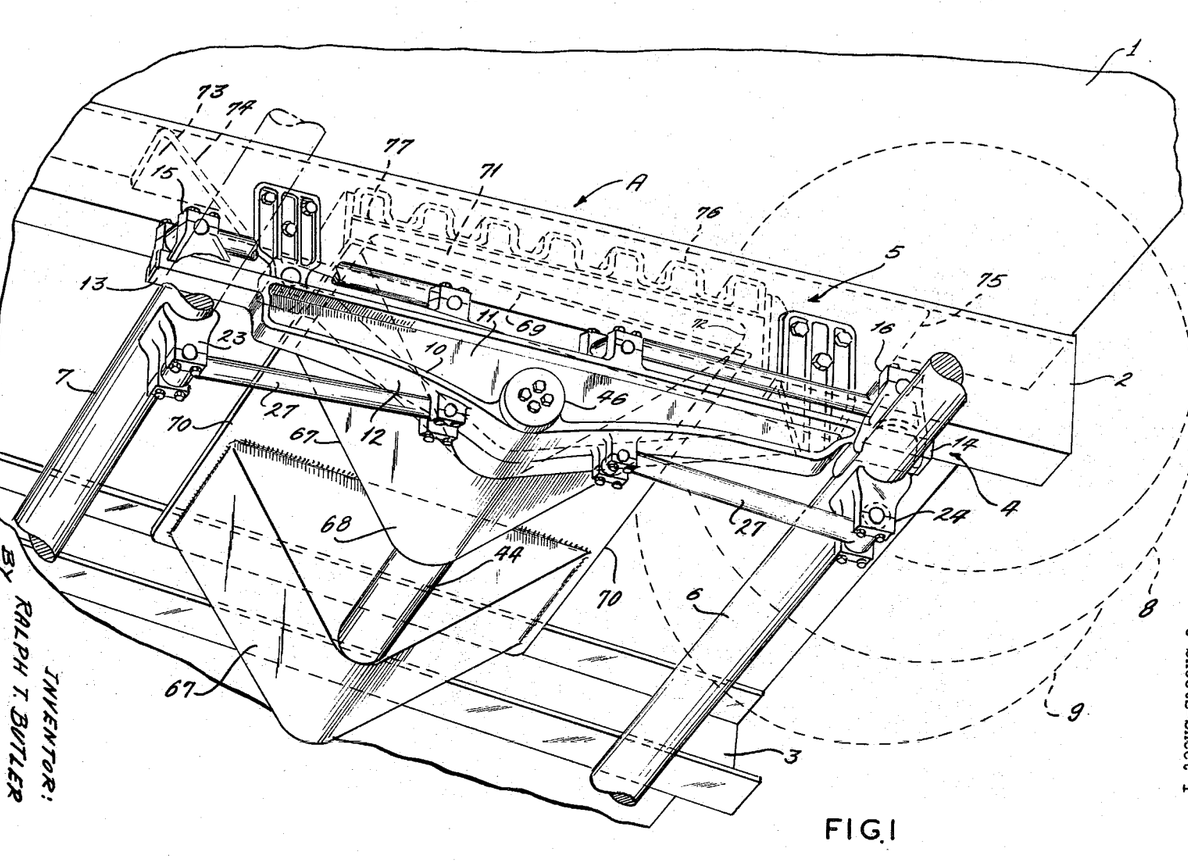
FIGURE 1 is a perspective view from the underside of the vehicle suspension of this invention as mounted to the substructure of a vehicle.
Figure 2:
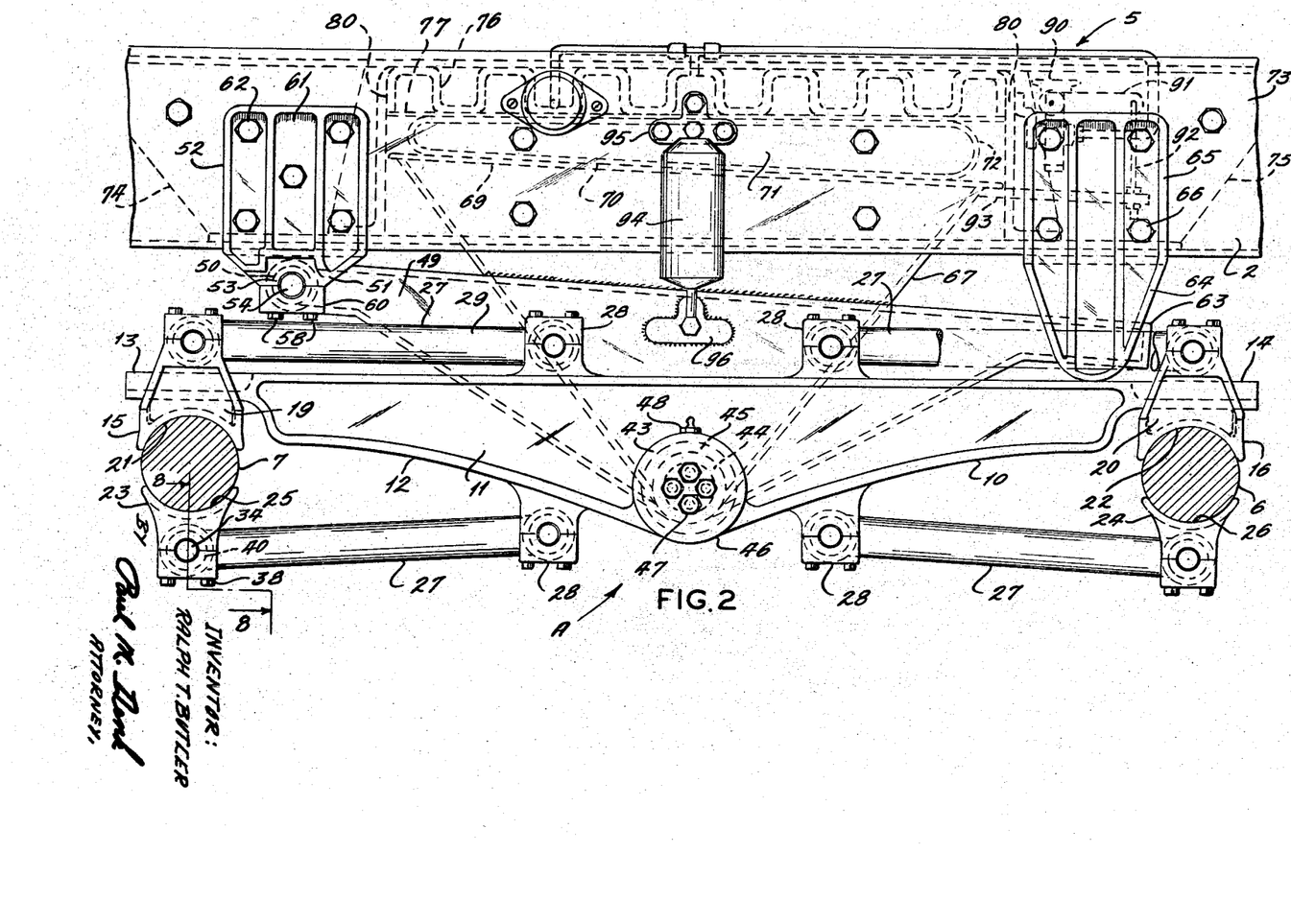
FIGURE 2 is a side view of the vehicle suspension revealed in FIGURE 1.

Referring now to the drawings for one illustrative embodiment of the vehicle suspension, in FIGURES 1 and 2, reference characteristic A generally designates the suspension as shown mounted for operation upon the underside of a vehicle 1, such as the trailer component of a heavy load carrying tractor-trailer assembly. The term vehicle is used generally in this application to define truck assemblies of all types that incorporate axle structures, and include, but are not limited to trucks, trailers, truck bodies and frames, truck chassis, and the like. Although the invention is herein revealed as being mounted proximate the rearward portion of the vehicle frame, such a suspension may be connected to any section of the underportion of a trailer body, or even may be employed as the suspension utilized for mounting a tandem of axles to the tractor portion of a tractor-trailer assembly, or to any other vehicle as just enumerated. This suspension A can be assembled as an independent packaged unit and subsequently be mounted for use to the vehicle by connecting the same to the standard channels 2 and 3 that are generally built into the construction of said vehicle.

Figure 3:
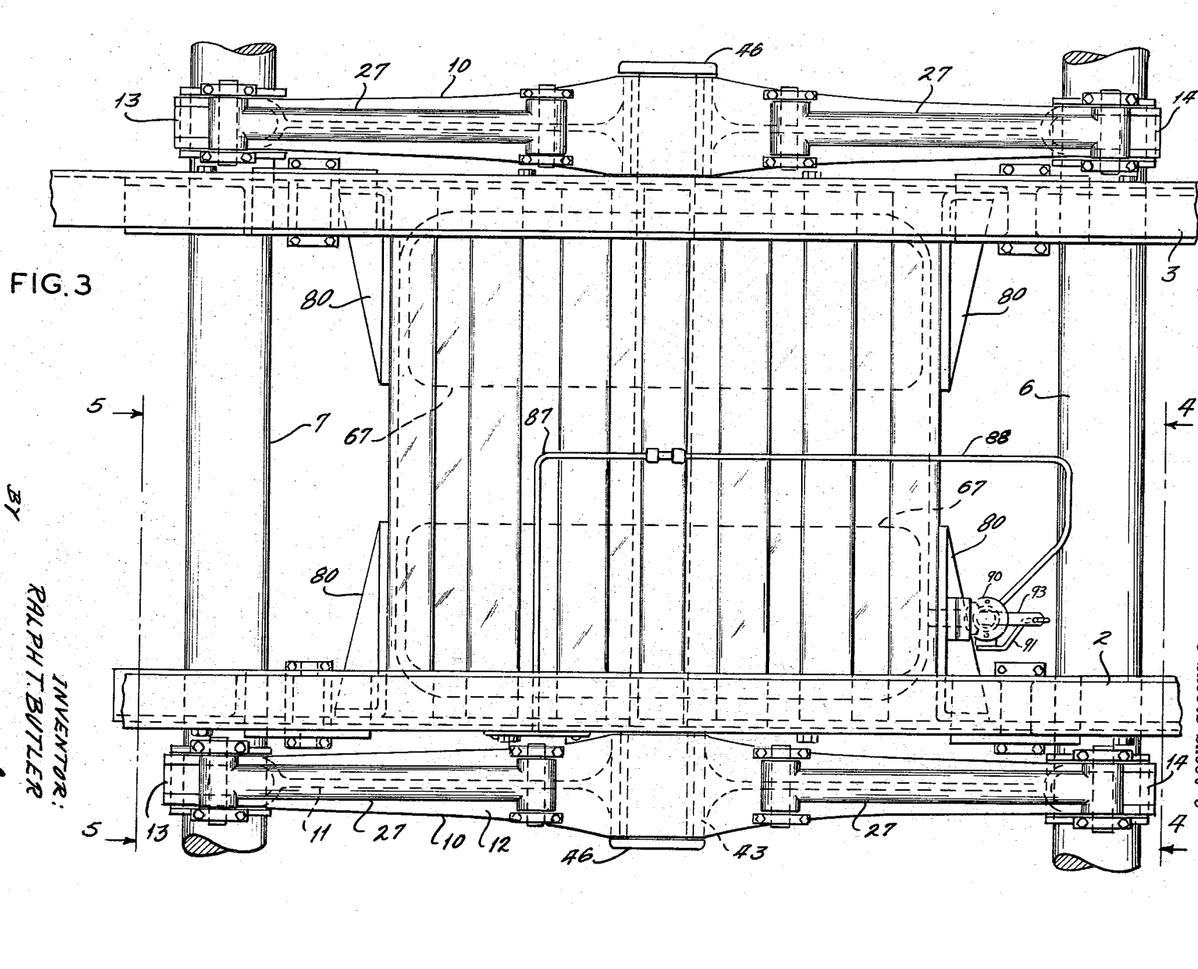
FIGURE 3 is a top plan view of the vehicle suspension.

The vehicle suspension A, in order to function properly, is usually constructed in two segments, generally designated as the unsprung portion 4 and sprung portion 5. See FIGURE 2. From this division of the suspension into segments, it can be seen that the unsprung section of the suspension is directly exposed to the shock and impact arising during vehicle movement, necessarily absorbing most of the forces that normally would be transferred into the sprung section 5 which is secured integrally into the vehicle. By referring to FIGURE 3, it can be seen that each side of the vehicle suspension, including both its sprung and unsprung sections, is symmetrical to the opposite side, and therefore, for purposes of clarification, only the integral parts of one side of the vehicle suspension is defined and analyzed herein, although the same parts are duplicated and included in the opposite side of the suspension.

The unsprung section 4 of the vehicle suspension is generally designated as the support means of the invention, providing the necessary structure for supporting the tandem of axles 6 and 7 with respect to the vehicle. These axles are of the type normally utilized upon a tractor-trailer assembly, each incorporating the drive mechanism which during usage provides the motivating force necessary for rotation of a pair of wheels, such as the wheels 8 and 9 revealed in FIGURE 1. Provided between each pair of axles is an equalizing arm 10 that spans the spacing intermediate said axles and maintains the distance therebetween a fixed dimension. Each equalizing arm is constructed as a form of structural member that is reinforced sufficiently so as to withstand the heavy impact exerted upon the axles. In this case the equalizing arm is revealed as a molded metallic beamlike structure having a web portion 11, of sufficient thickness and strength, and includes a perpendicular flange-like portion 12 that extends entirely around the periphery of the web. Projecting integrally from each end of the equalizing arm are inverted channel-like portions 13 and 14, that sungly insert within the upper axle seats 15 and 16, respectively. These upper axle seats are formed having recesses 17, 18 provided therethrough, wherein the channel portions 13 and 14 snugly insert and are tightly held in place To insure the retention of these channels within their respective axle seats, padding 19 and 20, formed of a resilient material, such as rubber having a durameter hardness of 85, is inserted intermediate the arcuate surfaces 21, 22 of the axle seats and the underside of the channels of the equalizing arm. This padding although useful for tightly holding each end of the equalizing arm in fixed relationship with the contiguous axle, also functions to provide a slight flexure to the engagement of the foregoing parts proximate this area so as to allow some play to the equalizing arm when any one axle, or end of an axle, is jarred out of alignment such as caused by a sudden impact. The acruate surface 21, 22 of each upper axle seat is mounted upon the casing of the axles 6, 7, and is secured integrally thereto by any form of connecting process, such as by the common welding method. Attaching to the underside of the axle casings 6, 7, are the lower axle seats 23 and 24, which secure by means of the welding of their acruate surfaces 25, 26, to the aforesaid axles. The function of these lower axle seats, just as is part of the function of the upper axle seats, is to provide for the slight pivotal mounting of the torque rods 27 to the upper and lower marginal surfaces of the axles and equalizing arm. Whereas, the outer ends of the torque rods 27 connect with either the upper or lower axle seats, their inwardly directed ends are secured to the pivot mounts 28 that connect to the upper or the lower flanges 12 of the equalizing arm 11. Providing torque rods 27 in the manner as shown helps to absorb the various forms of shock that are transmitted through the wheels and axles, and particularly, the shock that may be oriented in the near longitudinal direction. By this arrangement, the road impact is substantially contained within the unsprung segment of the suspension. Furthermore, the torque rods are useful in preventing any distortion or twisting of the equalizing arm, in particular the type of distortion that may develop at the area of connection of the channels 13 and 14 within their respective axle seats.

Figure 8:
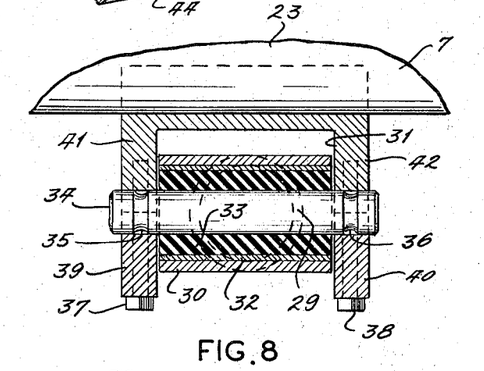
FIGURE 8 is a sectional view of an axle seat taken along the line 8—8 of FIGURE 2.

The pivotal connections and means for fastening of the torque rods 27 to the upper and lower axle seats and pivot mounts are identical in construction, and are formed in a manner as revealed in FIGURE 8. As disclosed, each torque rod is made of a longitudinal length of a tubular member 29 which has secured to each end perpendicularly a portion of similar tubular material 30, which has a length slightly less than the width of the channel-like recess 31 provided through said lower axle seat 23, thereby furnishing a reasonably close tolerance fitting of the torque rod within said seat. Tightly fitting within the tubular member 30 is a metallic sleeve 32, which encloses an additional bushing 33 of a resilient material, such as rubber or the like, for a tight fitting around the pin 34. The pin has a length slightly greater than the exterior width of the axle seat or pivot mount in which it seats, and proximate each end of said pin is formed having annular grooves 35, 36 which accommodate in a keyed relationship the shank portions of the lock-bolts 37, 38 which hold the torque rod into position thereat. These bolts 37, 38 insert through a pair of pivot clamps 39, 40, and respectively threadedly engage tightly within the legs 41, 42 extending integrally from the axle seats or pivot mounts. Under this arrangement, the pins 34 of each torque rod connection may provide for the slight pivotal movement of the end of its respective torque rod, such as may occur when an axle is unduly subjected to a distorting stress.

Provided through the central portion of each equalizing arm 10 is an aperture having an integral annular bearing mount 43 which is arranged for reception and retention of a trunnion 44 upon which the arm may slightly rotate. This trunnion extends the full width of the vehicle suspension and is maintained for a sung fitting within the equalizing arm by means of a bushing 45. A cap 46 attaches to each end of the aforesaid trunnion by means of the series of bolts 47, which thereby prevent the equalizing arms from disengaging the trunnion. A fitting 48 connects through the bearing mount and bushing 45 of the equalizing arm, and provides for the entrance of lubrication to the area proximate the inner surface of the bushing wherein the relative rotation of the arm upon the trunnion may be effected. It can be visualized that as the wheels upon the axle 7 encounter some form of an obstacle, such as a mound or depression in the roadway, that the axle and the contiguous portion of the equalizing arm will be forced out of alignment with the opposite axle and end of said arm. When such occurs, the equalizing arm will rotate a few degrees upon the trunnion 44.

Figure 5:
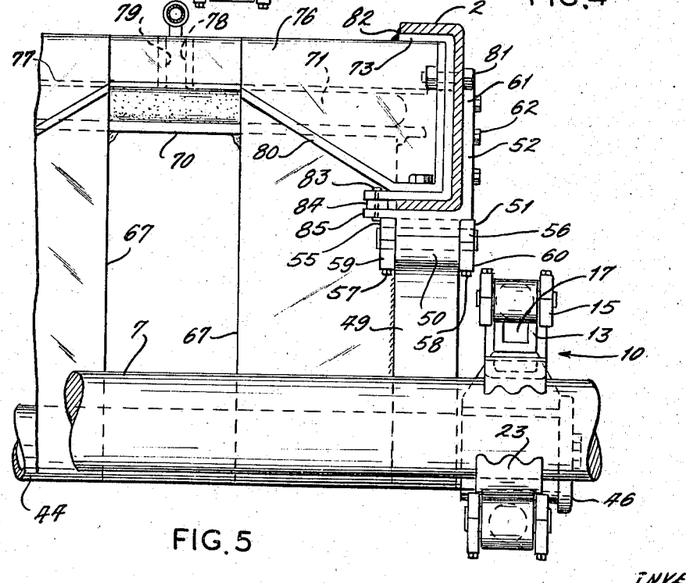
FIGURE 5 is a front end view of the left side of the vehicle suspension taken along the line 5—5 of FIGURE 3.

Provided integrally with the trunnion just inwardly of the equalizing arm, but unconnected therewith, are a pair of support beams 49. Since each support beam is secured to the trunnion 44, said beam remains fixed and free from any turning or pivoting upon the trunnion, unlike the equalizing arms. Each support beam 49 is constructed as a structural member that has sufficient reinforcement so as to withstand the forces of impact that are transmitted to the trunnion and partially to each beam. Much of the pressure of impact is exerted upon these members since they comprise the unsprung portion of the suspension. The support beams may be constructed as a casing, or into any other configuration such as a beam having a web reinforced by peripheral flanges, designed to sustain the maximum degree of impact that may be exerted upon the vehicle. The forward end of each support beam 49 is provided with an integral perpendicular sleeve 50 which attaches for slight pivotal movement within a mount 51 of a forward hanger-bracket 52. See FIGURE 5. The means for pivotal connection of the sleeve 50 to the mount 51 is quite similar in construction to the previously described connection of the torque rods to the axle seats and pivot mounts, as revealed in FIGURE 8. As shown, the sleeve 50 has tightly inserted therein a metallic bushing 53 which pivotally mounts upon the pin 54. See also FIGURE 2. The pin is wider in dimension than the sleeve in which it is inserted, and projects to approximately the outer surface of legs 55, 56 of the mount 51. Bolts 57 and 58 are inserted through clamps 59 and 60, thereby keying the pin 54 into fixed position, and said bolts tightly and threadedly engage within the aforesaid legs, thereby securing the support beam to the bracket. The upward portion of the hanger bracket comprises reinforced upright member 61 which connects by means of a series of bolts 62 tightly to the side of the vehicle channel 2. It can be seen that the forward end of the support beam 49 is pivotally mounted in fixed relationship with respect to the vehicle frame.

The rearward extremity of each support beam 49 is formed into an elongate channel-like member 63 which is fixed for limited vertical shifting within the guide 64 of the rear hanger-bracket 65. This bracket is secured by means of a series of bolts 66, or other fastening means, to the vehicle channel 2. Upon the vertical pivoting of the support beam 49 with respect to the front hanger-bracket 52, said pivotal normally being induced by the forces of impact exerted upon the vehicle axles and the associated trunnion, the channel member 63 will likewise shift vertically within the guide 64 of the hanger-bracket, which provides for a partial absorption of the exerted impact forces. It should be noted that not only does the support beam 49 furnish sufficient pivotal play so as to help reduce the transmittal of any vertical impact to the sprung section of the suspension, but likewise, any longitudinal or near horizontal forces exerted upon the vehicle axles will also cause the support beam to slightly pivot, thereby effectively minimizing the effect of these type forces.

Figure 6:
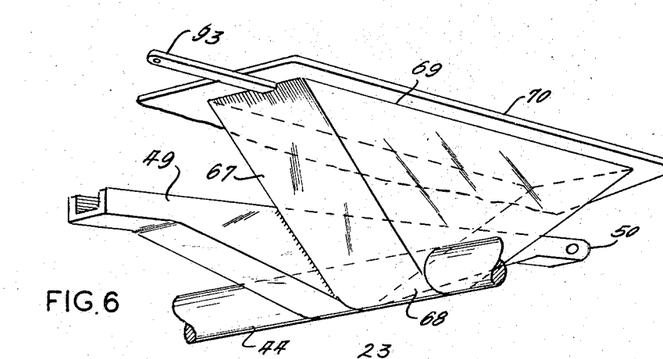
FIGURE 6 is a fragmentary perspective view of the left support beam and frame member of the invention.

Additionally mounting to the trunnion at a location just inwardly of the foregoing support beams are a pair of structural means comprising the frame members 67. See FIGURES 1 and 6. Each frame member is constructed as a casing, formed of metal or the like, having a reduced dimension at its downward portion, as at 68, frame memberur where connection is made to the trunnion, with the frame member tapering at increasing size upwardly towards the vehicle to form a surface area, which is located a limited distance from the underside of said vehicle so as to provide for a spacing therebetween. Mounted upon the upward edges 69 of the frame members is a plate 70 being of sufficient size so as to overlie the surface areas, and extend and overlap the forward and rearward ends of the frame members, said plate having a width slightly greater than the overall distance between the outer edges of the frame members. This plate 70 when mounted upon the frame members provides a spacing between its upward surface and the underside of the vehicle, and disposed within this spacing is a singular cushioning means 71, that is inflated with a degree of air pressure to provide some form of resistance or buffer against the shock transmitted through the trunnion and the frame members, preventing its transmission into the sprung portion of the suspension and the vehicle. The cushioning means may be constructed of rubber or any other elastic material, providing for its inflation or deflation, and comprising an insulator against shock. This resistancy against transfer of shock maintains the vehicle body free from the effects of the impact encountered by the vehicle, which thereby imparts to that part of the suspension that mounts to the underside of the vehicle and rests upon the cushioning means 71, a definition as the sprung portion 5 of the suspension. The cushioning means or bellows 71 is formed having a greater height proximate its rearward end 72, since the forces of impact transmitted to the cushioning means are not necessarily oriented only in a straight vertical direction, but rather, due to the pivotal connection of the support beams 49 to the vehicle channels, the component of forces are somewhat controlled by this pivotal movement, and are exerted upon said cushioning means on a rearward near vertical incline. Therefore, the cushioning means is constructed having a reduced size proximate its forward portion, and tapering at an increasing dimension to its rearward end 72, thereby causing a slight rearward incline in the alignment of the plate 70, such incline being at an angle which is nearly perpendicular to the direction of exertion of the impact forces as transferred through the support beams 49 and frame members 67. The sprung portion 5 of the suspension which secures to the underside of the vehicle, and in particular within its channels 2, 3, is mainly supported upon the cushioning means 71. This portion of the suspension comprises a pair of channels 73 which are of a size that allows for ease of their insertion within the vehicle channels 2, 3, and have a length just greater than the length of the suspension which provides for ease of attachment and connection of the same with sufficient structural support to the vehicle frame. The ends of each channel 73 is cut upon inclines 74, 75, so as to facilitate mounting of the suspension within the vehicle channels, and to help distribute the encountered stresses.

Figure 4:
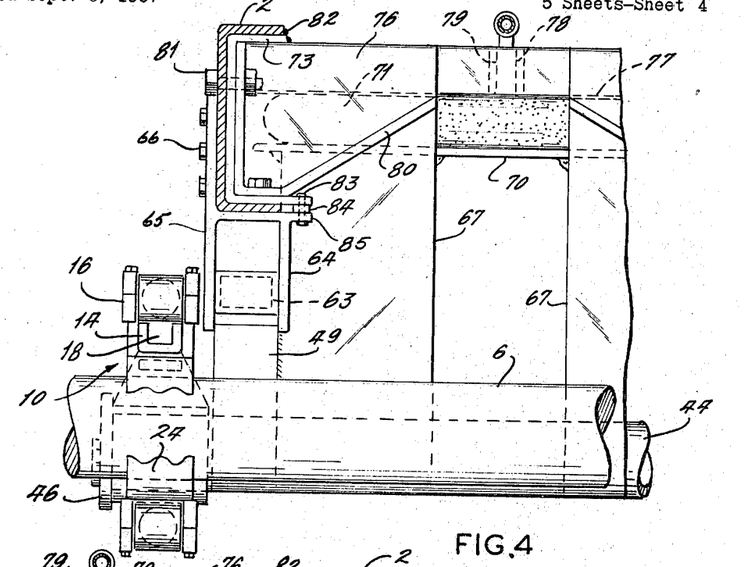
FIGURE 4 is a back end view of the left side of the vehicle suspension taken along the line 4—4 of FIGURE 3.
Figure 7:
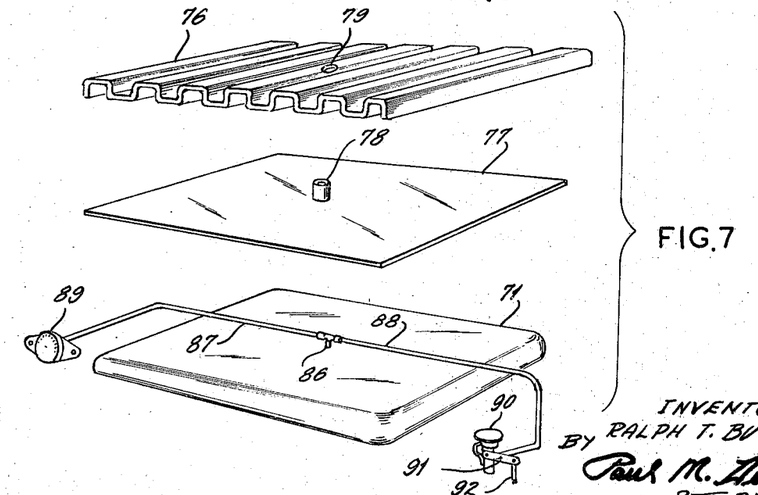
FIGURE 7 is an exploded view of the cushioning means, plate and framework that connect with the substructure of the vehicle body.

Connecting within the space between the channels 73 is a corrugated reinforcing member 76, which is welded to the web and upper flange portion of each channel, and substantially strengthens the sprung portion of the suspension, insuring its firm and secure mounting to the vehicle. See FIGURES 1 and 7. To the undesrside of the reinforcing member 76 attaches a plate 77, which is of a size approximately equivalent to the previously described plate 70, with said plate 77 disposed for resting upon the upward surface of the cushioning means 71. A sleeve 78 connects upon the plate 77, and is aligned with an aperture provided in said plate, said sleeve being disposed for insertion through an aperture 79 provided centrally through the reinforcing member 76. It can be seen that the cushioning means 71 is somewhat sandwiched under pressure intermediate the plates 70 and 77, and thereby effectively reduces the transmission of any of the forces of impact from said lower to the upper plate. To insure the attachment of the member 76 and plate 77 within the channels 73, a series of angle brackets 80 are connected between these parts. See also FIGURE 3. By referring to FIGURES 4 and 5, it is shown that the sprung portion of the assembly mounts securely within the channels 2, 3 of the vehicle. As shown, the angle brackets 80 and the channels 73 are secured by means of a series of bolts 81 contiguously together, and this is the only bolt connection that need be formed with the brackets as the entire preassembled suspension is inserted into position within the vehicle channels 2, 3, as when being mounted into place for usage. Automotive standards and regulations normally prohibit the use of bolts through the upper flange portions of the vehicle channels 2, 3, and for this reason a welding process, such as shown at 82, may be useful for supplementally securing the suspension to the vehicle. To reinforce the moutning of the lower flanges of the channels 73 within the suspension, a bolt 83 may be inserted through the channels 73 and the filler 84, and also through the projecting flange 85 of the hanger-brackets 52 and 65. Thus, it can be seen that the entire preassembled suspension can easily be inserted and mounted as an integral unit within the channels 2, 3 of the vehicle, and be readied for use within a minimum of time.

It is a feature of this invention to allow regulation of the air pressure contained within the cushioning means 71. By referring to FIGURES 3 and 7, said cushioning means 71 has projecting upwardly centrally thereof a neck portion 86 which inserts through the sleeve 78 integral with the upper plate 77, and further extends through the aperture 79 provided within the reinforcing member 76. A pair of air lines 87 and 88 connect with the neck portion 86 of the cushioning means, and provides communication for the insertion or release of air from within the interior of the same. Line 87 attaches to a gauge 89 that functions to provide for a direct instantaneous reading of the exact air pressure contained within the cushioning means, and said gauge, which may be calibrated, may be mounted to the side of the vehicle, readily exposed for ease of viewing. The air line 88 connects with a valve 90 which may provide for, upon manual adjustment, either the insertion or release of air within or from the cushioning means. As an alternative, the valve 90 may function automatically in response to the load upon the vehicle so as to provide for the insertion, or release, of air within the cushioning means when its internal pressure reaches an abnormally low or high level. In this manner, the cushioning means acts in the nature of a bellows. Such is achieved by means of an arm 91, which pivotally connects to the valve, and provides upon turning for release or insertion of air into the bellows. This arm connects by means of a link 92 for attachment with a projecting member 93 that extends rearwardly of the lower plate 70. Since the valve 90 and its arm 91 are stationarily mounted to the sprung section of the assembly, and more particularly to the reinforcing member 76 and upper plate 77, it can be visualized that any increase or decrease in the spacing intermediate the two plates 70 and 77 effects operation of the valve 90, actuating it for either releasing or inserting air into the bellows. The most frequent automatic use of this valve 90 will be effectuated when the air within the cushioning means reaches a reduced pressure, or when the spacing intermediate the adjacent plates becomes too narrowed due to the application of a heavy load upon the vehicle. When this occurs, the projecting arm 93 will push the link 92 upwardly for actuation of the valve arm 91 thereby providing for the insertion of air under pressure into the cushioning means. The air continues to be inserted into said cushioning means until it has expanded and holds that degree of air pressure sufficient to open the spacing intermediate the plates to that amount necessary to cease operation of the valve, and which furnishes a spacing with cushioning means therebetween sufficiently to effectively absorb the road shock. This automatic adjustment of the air pressure associated with the cushioning means provides for constant and effective resistance against the transmittal of any of the forces of impact into the sprung section of the vehicle, regardless of the amount or weight of cargo being transported by the vehicle.

To further assure the cushioning efficiency of the vehicle suspension, a shock absorber 90 may be mounted by means of a bracket 95 to the exterior of each vehicle channel 2, 3, and be further connected by means of a bracket 96 to the side of each support beam 49. Shock absorbers connected in this manner may further absorb the impact forces, minimizing their transmission from the unsprung to the sprung portion of the vehicle suspension.

Numerous variations in the construction of the vehicle suspension of this invention, within the scope of the appended claims, will occur to those skilled in the art in the light of the foregoing disclosure. For this reason, it is to be understood that the above-described embodiment is simply illustrative, and any variations in the suspension incorporating the principle of this invention are intended to be included within its spirit and scope thereof.

Having thus described the invention, what is claimed and desired to be secured by Letters Patent is:

1. A vehicle suspension for use in mounting axles to a vehicle, comprising a framework connected to the underside of said vehicle, support means mounting said vehicle and framework thereby governing the lateral and longitudinal phase of forces exerted toward the vehicle during movement, said support means comprising a pair of equalizing arms, each arm secured proximate each end to the vehicle axles, a trunnion rotatably connecting to each equalizing arm for allowing said arm to pivot slightly with the impact of vehicle movement, a pair of support beams, each beam approximately centrally joining with said trunnion, one end of each beam being pivotally mounted to the framework, the other end of each beam being free for limited movement with respect to the framework, cushioning means provided intermediate said support means and framework for buffering the vehicle against impact caused during said vehicle movement, and structural means connecting to said trunnion for supporting said cushioning means elastically against the framework and vehicle.

2. The vehicle suspension of claim 1 and further characterized by a pair of torque rods connecting proximate each end with the equalizing arms to the axles, one of each pair of said torque rods being mounted in alignment with the upward edge of each arm, the other of said torque rods being mounted to the downward edge of said arm, each pair of torque rods being provided for restraining their proximate equalizing arm and axles from turning and distorting during movement of the vehicle.

3. The vehicle suspension of claim 1 wherein said structural means comprises a pair of frame members, each frame member being secured to the trunnion and being expanded upward to form an enlarged surface area for supporting the cushioning means, and said frame members being spaced apart for providing an intermediate spacing for location of the various vehicle drive mechanisms.

4. The vehicle suspension of claim 3 including a first plate approximately horizontally disposed and being mounted contiguously at the surface areas of the frame members, a second plate connecting with the framework of said vehicle and being spaced from said first plate, the spacing intermediate said plates subject to variation produced through the vertical shifting of the axles during movement of the vehicle, said cushioning means being located within the spacing provided between said plates and having sufficient elasticity to provide for its expansion and contraction with the movement of the plates thereby buffering against the transmittal of shock from the first to the second plates, and valve means providing for insertion or release of air communicating with said cushioning means.

5. The vehicle suspension of claim 4 wherein said valve means comprises an air valve being responsive to the variations in space between said first and second plates whereby air is automatically inserted into said bellows during excessive narrowing of said plate space.

6. A vehicle suspension for use in mounting axles to a vehicle, said vehicle suspension comprising sprung and unsprung sections, said unsprung section including a pair of equalizing arms secured at each end to the vehicle axles, a trunnion rotatably connecting to each equalizing arm, a pair of support beams, each beam being centrally mounted to said trunnion, one end of each beam being pivotally mounted to said sprung section, the other end of each beam being confined to limited movement with respect to said sprung section, structural means connecting to said trunnion, and cushioning means supported by said structural means elastically against said sprung section for minimizing the transmittal of impact forces from said unsprung section to the vehicle during movement.

References Cited

UNITED STATES PATENTS 3,066,948 12/1962 Cain _____________ 280—104.5
3,129,953 4/1964 Hickman.

PHILIP GOODMAN, Primary Examiner